United States Patent [19]
Gray

[11] Patent Number: 4,501,935
[45] Date of Patent: Feb. 26, 1985

[54] DETECTING A DC NONLINEARITY TERMINATING A NETWORK

[75] Inventor: Michael A. Gray, Parsippany

[73] Assignee: AT&T Bell Laboratories, Murray Hill, N.J.

[21] Appl. No.: 515,538

[22] Filed: Jul. 20, 1983

[51] Int. Cl.³ .............................................. H04M 1/24
[52] U.S. Cl. .............................. 179/175; 179/175.3 R; 179/18 AB; 324/62
[58] Field of Search ............. 179/175.3 R, 175, 175.1, 179/175.11, 175.2 C, 175.3 F, 18 AB, 18 FA; 324/62

[56] References Cited
U.S. PATENT DOCUMENTS
4,034,161 7/1977 Hoppough .............. 179/175.2 C X
4,034,162 7/1977 Holt .............................. 179/18 AB
4,298,969 11/1981 Rickenbacker .......... 179/175.3 F X OTHER PUBLICATIONS
"Locating Cable Faults", Charles A. Maloney, *IEEE Transactions on Industry Applications,* Jul.-Aug. 1973, pp. 380-394.

Primary Examiner—Stafford D. Schreyer
Attorney, Agent, or Firm—J. T. Peoples

[57] ABSTRACT

A methodology for identifying a telephone receiver-off-hook (ROH) condition within the class of resistive faults occurring on a subscriber line is disclosed. The method utilizes the nonlinear DC characteristic exhibited by an off-hook handset. First and second DC resistances are measured in response to first and second DC sources applied at a test point associated with the line. A resistance differential between the two resistances is compared to a resistance range. A ROH condition is indicated if the differential falls within the range.

8 Claims, 1 Drawing Figure

DETECTING A DC NONLINEARITY TERMINATING A NETWORK

FIELD OF THE INVENTION

This invention relates generally to a methodology for characterizing the electrical properties exhibited by networks and, more particularly, to a methodology for determining if a DC nonlinearity terminates a transmission line from measurements effected at the input to the line.

BACKGROUND OF THE INVENTION

In telecommunication systems, the end portions of the electrical path between subscriber premises are typically served by multipair cables. Each cable generally comprises numerous conductors arranged as twisted pairs which are encompassed by a protective sheath. The conductors of a pair—referred to as the tip and ring conductors—constitute a two-wire transmission line which is utilized for communication and signaling as well as testing purposes.

Various types of telephone equipment terminate the different transmission lines serving the customer premises. Of course, one standard termination is a telephone set. Although there are presently numerous styles and types of telephone sets, the fundamental principle of operation for each in effecting transmission is the same, namely, modulating a DC line current via a pressure transducer, typically a carbon microphone, to generate an electrical signal on the line.

During the course of usage of a telephone set by a customer, situations occur wherein a telephone receiver may be either intentionally or inadvertently removed from the switchhook for prolonged periods without a dialing activity. Such a condition is referred to as a ROH (receiver-off-hook) fault. In implementing a subscriber line testing strategy to detect or locate line faults, it is important to distinguish a ROH fault from a resistive fault that may occur along the cable route. Repair of cable faults is labor intensive, so considerable savings will accrue if a false dispatch of cable repair personnel can be eliminated. One such false dispatch is eliminated if a ROH condition is correctly diagnosed.

One conventional method of detecting a ROH condition utilizes an AC methodology. Briefly, with this method, a tone in the voice band is applied to the suspect line and the signal magnitudes at the second and third harmonic frequencies of the tone are measured. These magnitudes are then compared to preselected threshold values to determine a potential ROH condition. Because a telephone set with a receiver-off-hook exhibits a nonlinear signal response characteristic, harmonic levels above the threshold indicate a ROH. This is in contrast to resistive fault characteristics which are basically linear over the measurement interval.

One shortcoming of the AC method is the low reliability of the harmonic information whenever AC noise is present on the line. Another deficiency is the inability to distinguish a ROH condition from a tone ringer since a tone ringer returns harmonics similar to those of an off-hook telephone set. With the proliferation of tone ringers, this inability to differentiate presents a serious limitation on the future use of the AC method.

SUMMARY OF THE INVENTION

The shortcomings, deficiencies and limitations of this and other conventional techniques for identifying a receiver-off-hook condition are obviated, in accordance with the present invention, by an improved method that utilizes the nonlinear DC characteristic exhibited by a telephone handset transmitter.

Broadly speaking, the method of the preferred embodiment requires the sequential determination of first and second DC resistances at the input to the customer line due to first and second impressed DC currents. A DC resistance differential between the two resistances is compared to a resistance range. If the differential falls within the range, an indication of a ROH condition is provided. The two current values are chosen to produce an observable differential given the variability of lines and telephone receivers.

One feature of the present invention is that the method is unaffected by a tone ringer terminating the line since a tone ringer exhibits a large shunt resistance at DC.

The organization and operation of this invention will be better understood from a consideration of the detailed description of the illustrative embodiment thereof, which follows, when taken in conjunction with the accompanying drawing.

BRIEF DESCRIPTION OF THE DRAWING

The sole FIGURE depicts the nonlinear DC characteristic of a telephone set as a function of DC input current.

DETAILED DESCRIPTION

Figure 1:
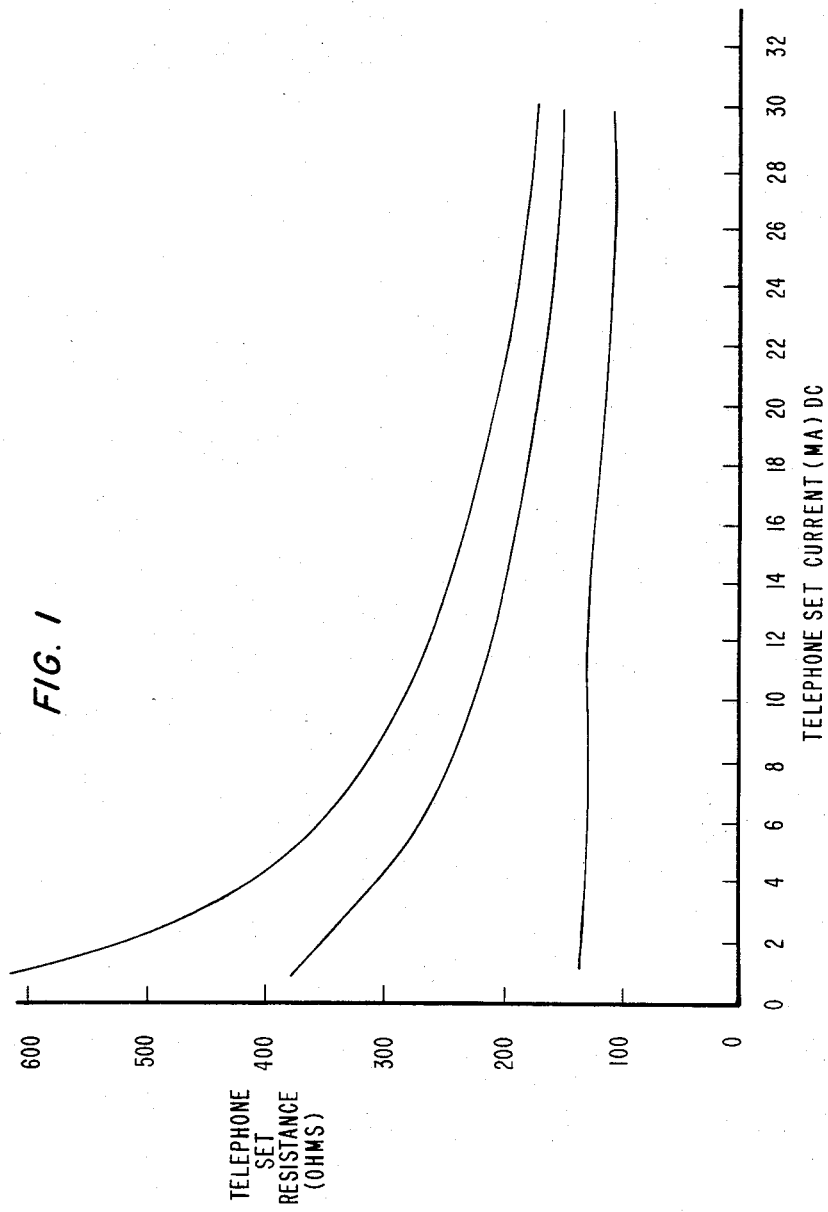

When a telephone handset is off-hook, that is, bridging the end of the transmission line emanating from the central office, the telephone set exhibits a nonlinear DC resistance. This resistance is composed of two components, namely, the resistance of voice network elements as well as the resistance of the carbon microphone. The FIGURE shows a qualitative depiction of the average as well as the upper and lower extremes of the DC resistance as a function of DC current into a standard telephone set. Since the DC resistance of a customer line is of the same order as the telephone set resistance, the nonlinearity is reflected to the input of the line so measurements to detect the nonlinearity can be completed on a centralized basis.

An examination of the curves of the FIGURE reveals that a discernible differential, typically one hundred ohms or more, occurs between measurements at a low current (e.g., 2 ma) and a high current (e.g., 30 ma). The basic method of obtaining first and second resistance values at the line input and comparison to a threshold follows from this examination.

This basic method, when utilized with centralized testing, requires enhancement. For example, one representative testing arrangement employs testing equipment that: (i) applies a voltage source to the line rather than a current source; and (ii) measures the line through an interposed test trunk connection, so that a step prior to the actual measurements is the conversion of the test currents to test voltages. The test voltage corresponding to each test current may be based on an estimate to the total anticipated DC resistance including line and telephone set resistance, test trunk resistance and the output resistance of the measurement equipment. Also, a resistance measurement may be effected using a voltage source that causes current flow in the high range of the FIGURE. This minimizes the contribution of the telephone set resistance to the total measured resistance.

The following pseudocode statements describe the illustrative method for centralized testing, including the current-to-voltage transformation based on an actual measurement, called "resistance", which is passed to the routine upon entry.

```
/* differential resistance in ohms to determine ROH */
# define DCROHDIFF 60.0
* maximum differential in ohms to determine ROH */
# define DCROHMAX 3000000.
# define HIGH 1
define LOW 2 float vdctemp;
float resistance;
/* DC source applied to tip */
float VDC_tip;
/* DC source applied to ring */
float VDC_ring;

/* First measurement (high current) */
/* voltage required to produce 60 ma */
vdctemp=60.0e−3 * resistance;

/* limit to 120 volts */
if (vdctemp>120.0)
VDC_tip=120.0;
else VDC_tip=vdctemp;
VDC_ring=0.0;

/* high current measurement */
measure idc_TR;

/* compute resistance at high current */
rroh[HIGH]=(VDC_tip−VDC_ring)/idc_TR;

/* Second measurement (low current) */
/* voltage required to produce 1.2 ma */
vdctemp=1.2e−3 * resistance;

/* make sure VDC_tip is at least 2.2 volts */
if(vdctemp<2.2)
VDC_tip=2.2;
else VDC_tip=vdctemp;
VDC_ring=0.0;

/* low current measurement */
measure idc_TR;

/* compute resistance at low current */
rroh[LOW]=(VDC_tip−VDC_ring)/idc_TR;

/* if the difference between the two measurements is at
   least DCROHDIFF and no more than DCROH-
   MAX, set ROH.
Otherwise, set NOT ROH. */ if(rroh[LOW]−rroh[HIGH]>DCROHDIFF &&
    rroh[LOW]−rroh[HIGH]<DCROHMAX)
    set result=ROH;
   else set result=NOT ROH;
```

Within the psuedocode, it is noted that: (i) the maximum voltage placed on the line is 120 v; (ii) the minimum voltage placed on the line is 2.2 v so as to forward bias a series diode which may be present in some telephone sets; and (iii) the highet differential resistance, DCROHMAX, is set as 3 megohms to prevent mistaking certain other terminations for an off-hook telephone set.

It is to be further understood that the methodology described herein is not limited to the specific form disclosed, but may assume other embodiments limited only by the scope of the appended claims.

What is claimed is:

1. A method for determining if a DC nonlinearity terminates a network accessible via an input port, said method comprising the steps of
    measuring first and second DC resistances at said input port in response to first and second DC sources, and
    indicating the presence of said nonlinearity whenever the difference between said first and second resistances falls within a predetermined range.

2. The method as recited in claim 1 wherein said DC sources are current sources and one of said sources substantially exceeds the other of said sources.

3. A method for determining if a DC nonlinearity terminates a network accessible via an input port, said method comprising the steps of
    applying a first current source at said input port and measuring a first voltage to provide a first DC resistance,
    applying a second current source at said input port and measuring a second voltage to provide a second DC resistance,
    subtracting said second resistance from said first resistance to obtain a resistance difference, and
    comparing said difference to a predetermined threshold and indicating the presence of said nonlinearity whenever said difference exceeds said threshold.

4. A method for determining a receiver-off-hook (ROH) condition of a telephone set terminating a subscriber line from measurements at a test point, said method comprising the steps of
    measuring a first DC resistance at said test point in response to a first DC voltage,
    selecting second and third DC current values,
    providing second and third DC test voltages corresponding to said second and third DC currents, respectively, times said DC resistance,
    applying said second DC voltage at said test point to measure a second DC resistance,
    applying said third DC voltage at said test point to measure a third DC resistance, and
    indicating the presence of said ROH condition whenever the difference between said second and third DC resistances falls within a predetermined range.

5. The method as recited in claim 4 wherein said test point is at the input to said line.

6. The method as recited in claim 4 wherein said test point is at the input to a network comprising a test trunk in cascade with said line.

7. The method as recited in claim 6 wherein said second DC current value substantially exceeds said third DC current value.

8. The method as recited in claim 7 wherein said second DC voltage is less than a preselected maximum value and said third DC voltage greater than a predetermined minimum value.

* * * * *